United States Patent [19]

Garland

[11] Patent Number: 5,062,588

[45] Date of Patent: Nov. 5, 1991

[54] SEGMENTED ROTATABLE NOZZLES

[75] Inventor: Douglas Garland, Rexdale, Canada

[73] Assignee: Boeing of Canada Ltd., Downsview, Canada

[21] Appl. No.: 307,449

[22] Filed: Feb. 8, 1989

[51] Int. Cl.⁵ .............................................. B64C 29/00
[52] U.S. Cl. ............................... 244/23 D; 244/23 B; 244/12.4; 244/12.5
[58] Field of Search ................. 244/23 A, 23 B, 23 D, 244/110 B, 12.4, 12.5; 239/265.19, 265.23

[56] References Cited

U.S. PATENT DOCUMENTS

| | | | |
|---|---|---|---|
| Re. 31,591 | 5/1984 | Drakeley | 244/110 B |
| 3,096,954 | 7/1963 | Bauger et al. | 244/23 D |
| 3,099,423 | 7/1963 | Wilde et al. | 244/23 D |
| 3,159,362 | 12/1964 | Laing | 244/12.1 |
| 3,212,731 | 10/1965 | Kappus | 244/12.1 |
| 3,258,206 | 6/1966 | Simonson | 239/265.27 |
| 3,310,948 | 3/1967 | Culp | 60/229 |
| 3,348,380 | 10/1967 | Rees | 60/229 |
| 3,380,661 | 4/1968 | Markowski | 239/265.29 |
| 3,491,970 | 1/1970 | Maguire | 244/12.5 |
| 3,545,701 | 12/1970 | Bertin | 244/12.1 |
| 3,611,725 | 10/1971 | Short | 60/229 |
| 3,664,611 | 5/1972 | Harris | 244/12.1 |
| 3,770,227 | 10/1973 | Von Ohain et al. | 244/12.4 |
| 3,819,134 | 6/1974 | Throndson | 244/12.1 |
| 3,830,451 | 8/1974 | Fosness | 244/12.1 |
| 3,831,887 | 8/1974 | Fosness | 244/12.1 |
| 3,860,200 | 1/1975 | Petrushka | 244/12.1 |
| 3,893,638 | 7/1975 | Kelly | 244/12 D |
| 3,941,335 | 3/1976 | Viets | 244/12.1 |
| 4,171,112 | 10/1979 | Harvey | 244/12.5 |
| 4,205,813 | 6/1980 | Evans et al. | 244/12.5 |
| 4,235,397 | 10/1980 | Compton | 244/12.5 |
| 4,248,041 | 2/1981 | Wilde et al. | 244/12.5 |
| 4,301,980 | 10/1981 | Bradfield et al. | 244/12.5 |
| 4,343,446 | 8/1982 | Langley | 244/12.5 |
| 4,391,424 | 7/1983 | Bartoe, Jr. | 244/207 |
| 4,392,621 | 7/1983 | Viets | 244/12.5 |

FOREIGN PATENT DOCUMENTS 1308818 11/1963 France ............................... 244/12.5
1441516 7/1976 United Kingdom ............... 244/12.5

OTHER PUBLICATIONS

National Aeronautics and Space Administration, Dynamic Pressure and Thrust Characteristics of Cold Jets Discharging from Several Exhaust Nozzles Designed for VTOL Downwash Suppression by: C. C. Higgins and T. W. Wainwright.

National Aeronautics and Space Administration, Exhaust Jet Wake and Thrust Characteristics of Several Nozzles Designed for VTOL Downwash Suppression Tests In and Out of Ground Effect with 70° F. and 1200° F. Nozzle Discharge Temperatures by: C. C. Higgins, D. P. Kelly and T. W. Wainwright.

Primary Examiner—Joseph F. Peters, Jr.
Assistant Examiner—Christopher P. Ellis
Attorney, Agent, or Firm—Rogers, Bereskin & Parr

[57] ABSTRACT

A thrust deflector for use in VSTOL aircraft which has a pressurized gas generator. The thrust deflector consists of a number of adjacent nozzles. Each of the nozzles has a body with a first face and a second face. The nozzles further have an inlet for receiving pressurized gas from the pressurized gas generator and at least one outlet connected to the inlet for discharging pressurized gas from the nozzle. Each of the nozzles is rotatable from a first position in which the outlet directs pressurized gas downwardly, to a second position in which the outlet directs pressurized gas rearwardly. In the first position the first and second faces of the bodies of adjacent nozzles are spaced apart to permit air to flow between the nozzles. In the second position the first and second faces of adjacent nozzles are in contact preventing air passage between adjacent nozzles. The thrust deflector may be mounted in stub wings along either side of the fuselage or in a chordwise arrangement in the main wing of the aircraft. Lower ejector doors may be rotatably mounted adjacent the nozzles distal the fuselage and the nozzles suitably spaced to cause thrust augmentation according to the ejector principle.

20 Claims, 9 Drawing Sheets

SEGMENTED ROTATABLE NOZZLES

FIELD OF THE INVENTION

This invention relates to lift and propulsion systems for aircraft, and more particularly to a thrust deflector for vertical and short take-off and landing aircraft.

BACKGROUND OF THE INVENTION

The term "VSTOL aircraft" is used herein to refer to both vertical take-off and landing aircraft and short take-off and landing aircraft It is known in the art of VSTOL aircraft to deflect thrust from the engines of the aircraft downwardly for take-off or landing. Typical methods for deflecting thrust from the engines include deflector blades, rotatable engine nozzles, and rotating the entire power unit.

Typical VSTOL aircraft, particularly those capable of attaining high speeds, use a combustion engine which acts as a pressurized gas generator which generates pressurized gas for propelling the aircraft. A problem faced by VSTOL aircraft is that the temperature of the pressurized gas is quite high, typically in the range of 1,000° F. and higher, and the pressure is also considerable. When the pressurized gas is directed downwardly, the high temperature and pressure tends to melt tarmac, erode concrete and even heat metal plates below the aircraft to unacceptably high temperatures. The result is that operation of VSTOL aircraft is restricted, and take-off or landing must often be performed with some forward movement to reduce the damage.

SUMMARY OF THE INVENTION

According to the present invention there is provided a thrust deflector for use in VSTOL aircraft having a pressurized gas generator fluidly communicating with a horizontal thrust outlet through a passage. The thrust deflector has a plurality of adjacent nozzles mounted in an aerodynamic element having upper and lower surfaces. Each of the nozzles has a unitary body with a first face and a second face, an inlet for receiving pressurized gas from the passage and at least one outlet fluidly connected with the inlet for discharging the pressurized gas. Each of the nozzles is rotatable about an axis, from a first position in which the outlet is directed generally downwardly, to a second position where the outlet is directed generally rearwardly. In the first position the first and second faces of the bodies of the adjacent nozzles are spaced apart to define an air entrainment channel therebetween, the air entrainment channel being generally unobstructed above and below the nozzles. In the second position the first and second faces of the adjacent nozzles contact thereby closing the air entrainment channels and forming continuous upper and lower surfaces which are at least adjacent the upper and lower surfaces respectively of the aerodynamic elements.

The thrust deflector may be mounted in a stub wing along either side of the fuselage or chordwise in the main wing of the aircraft.

BRIEF DESCRIPTION OF THE DRAWINGS

For a better understanding of the present invention, and to show more clearly how it may be carried into effect, reference will now be made by way of example to the accompanying drawings, in which.

DETAILED DESCRIPTION OF THE INVENTION

The decay of temperature and pressure of a jet of hot air being discharged from an engine nozzle arises from the mixing of the jet with ambient air surrounding the jet. A small diameter jet decays much more rapidly than a large diameter jet. The thrust deflector of the present invention divides the large jet emanating from an aircraft engine into a number of small jets. The small jets are spaced apart to promote their mixing with ambient air, resulting in considerably more rapid temperature and pressure decay than that of the large jet in the same physical length.

Figure 1:
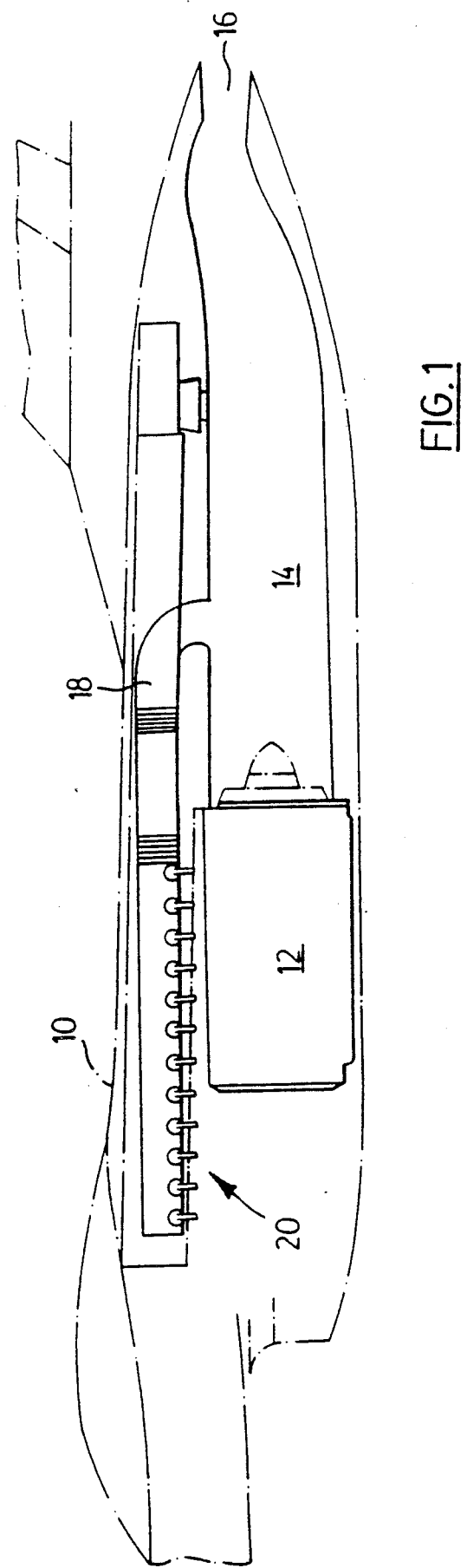
FIG. 1 shows a diagrammatic side view of a VSTOL aircraft embodying a thrust deflector according to the present invention.

Referring to FIG. 1 the outline of a portion of the fuselage of an aircraft 10 is shown in dashed lines. The aircraft has an engine 12 which acts as a pressurized gas generator for generating pressurized gas by the combustion of fuel. Pressurized gas leaves the engine 12 through the passage 14. The pressurized gas may be discharged from the rearward opening 16 at the rearward end of the aircraft fuselage to provide the principal horizontal thrust for the aircraft 10 when flying at high forward speeds.

Figure 2:
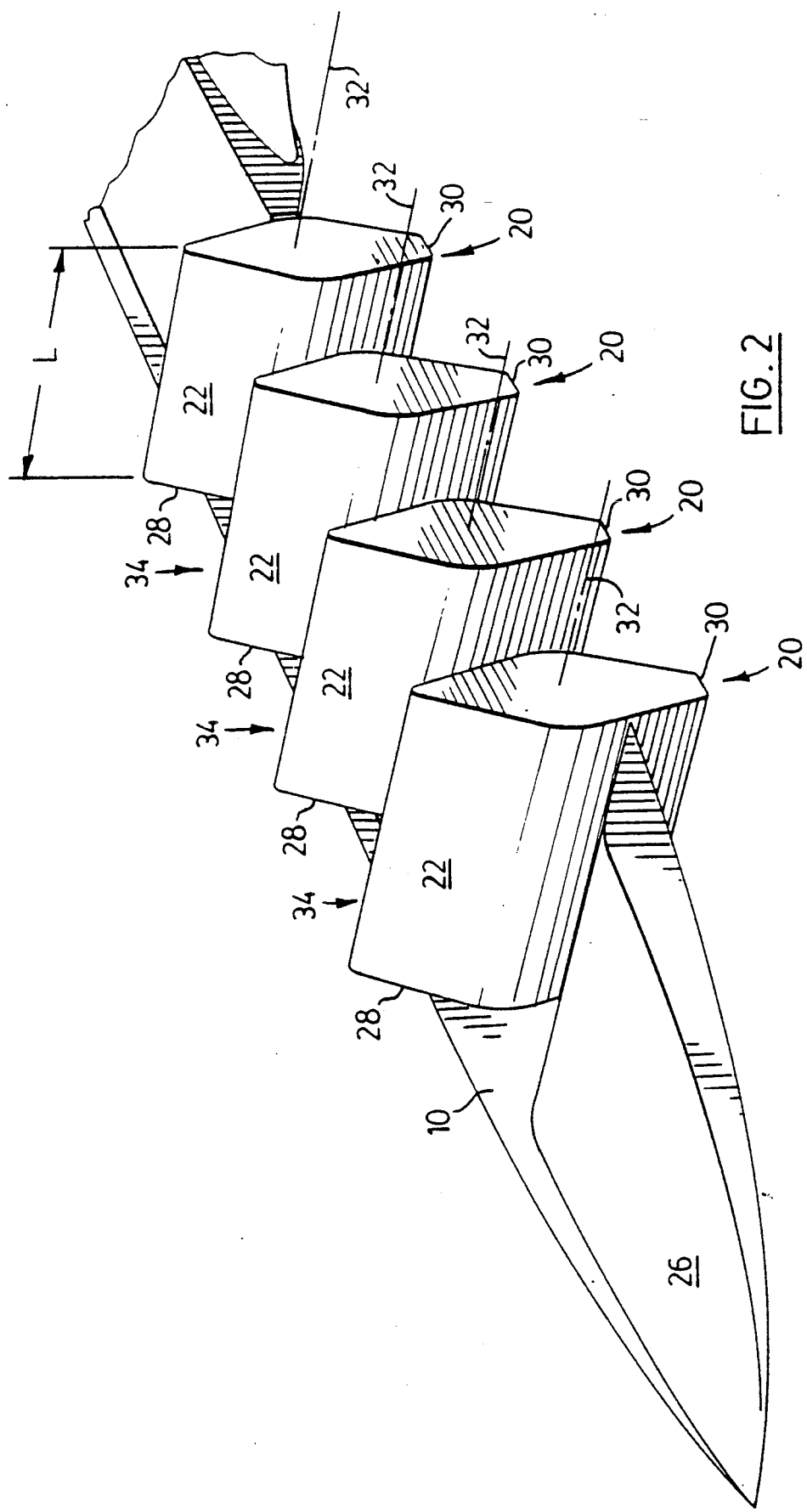
FIG. 2 shows a perspective view of a stub wing having a thrust deflector according to the present invention in its first position.
Figure 3:
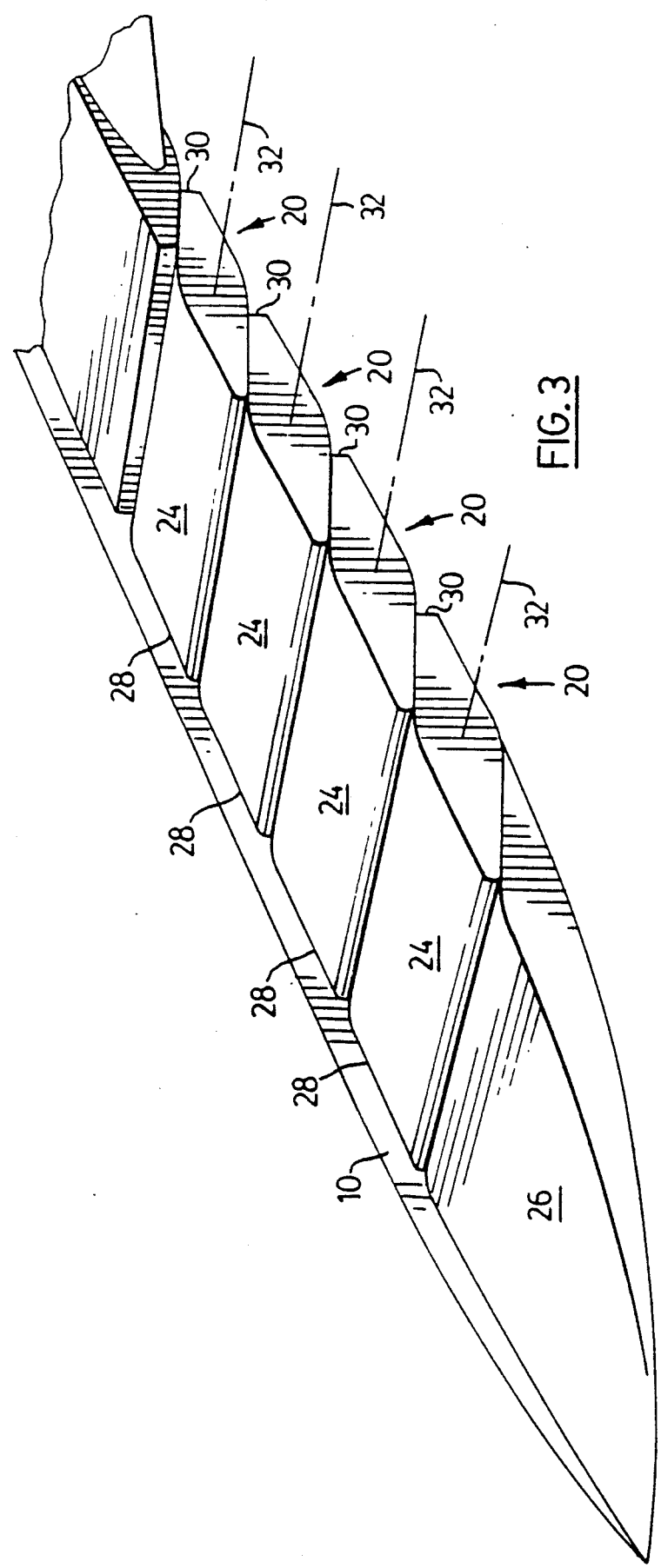
FIG. 3 shows the stub wing of FIG. 2 with the nozzles rotated to their second position.
Figure 8:
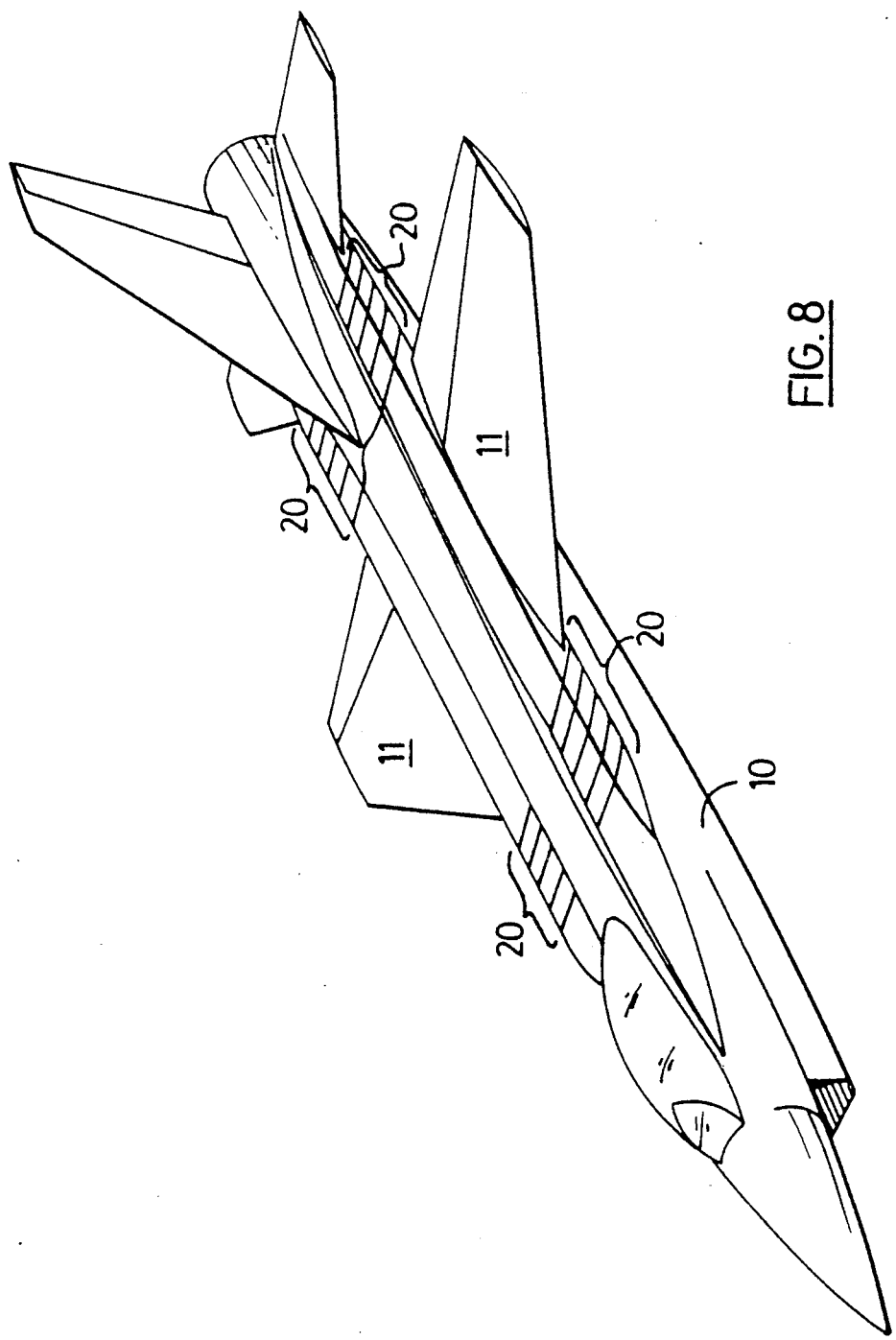
FIG. 8 shows a perspective view of a VSTOL aircraft having nozzles according to the present invention mounted in stub wings fore and aft of the main wing on both sides of the aircraft fuselage.
Figure 9:
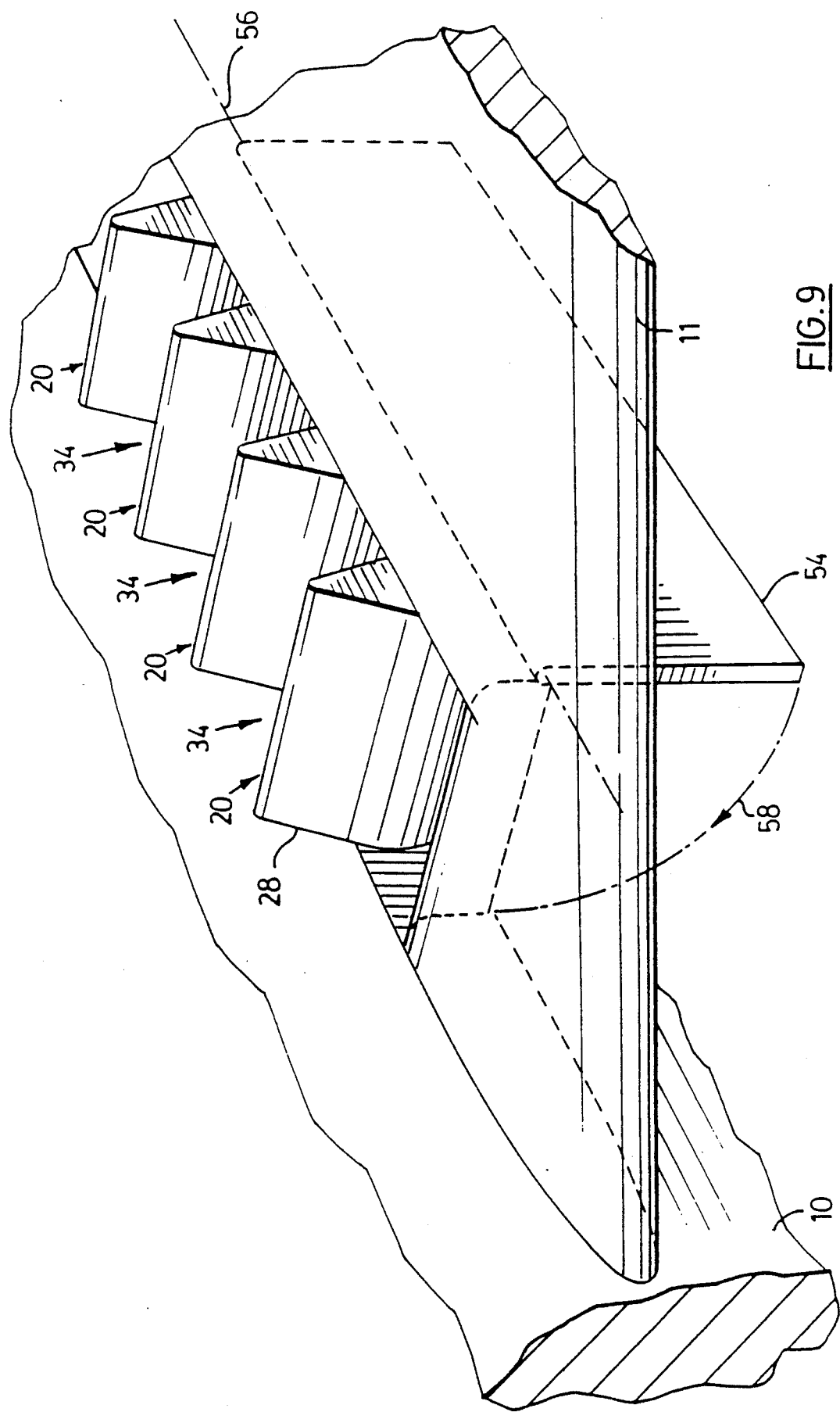
FIG. 9 shows a perspective view of a portion of a main wing of a VSTOL aircraft having nozzles according to the present invention mounted therein and further having an ejector lower door.; and, FIG. 10 shows a perspective view of a portion of a main wing of a VSTOL aircraft having nozzles according to the present invention, the nozzles being further provided with upper doors and the wing being provided with an ejector lower door.
Figure 10:
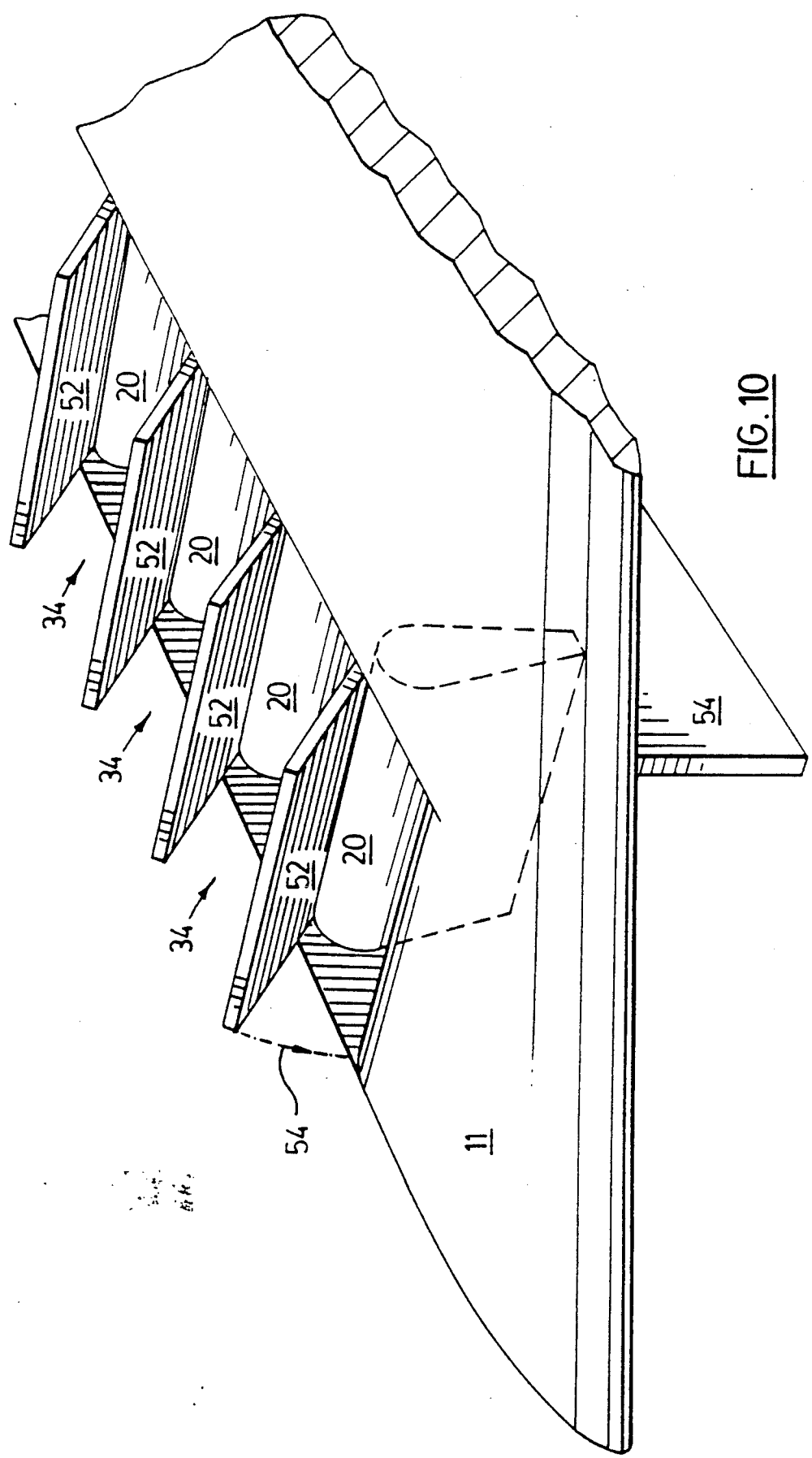

For VSTOL operation, at least a portion of the pressurized gas from engine 10 is diverted from the passage 14 through the duct 18. This will of course require throttling of the passage 14 which can be achieved, for example, by blocking passage 14 downstream of the duct 18 or obstructing the outlet 16 in any conventional manner. The duct 18 fluidly communicates with the passage 14 and with the nozzles 20 along either side of the aircraft fuselage 10. The nozzles 20, as shown in FIG. 8, may be located in stub wings forward and aft of the main wing 11 along both sides of the aircraft fuselage. Alternatively as shown in FIGS. 9 and 10, the nozzles 10 may be placed in the aircraft's main wing in a chordwise arrangement on both sides of the fuselage. FIGS. 2 and 3 show a series of nozzles 20 located in a stub wing forward of the main wing.

The nozzles are shown in FIGS. 2 and 3 as having a generally parallelogram-like cross section. The nozzles have a body with a first face 22 (FIG. 2) and a second face 24 (FIG. 3).

Figure 12:
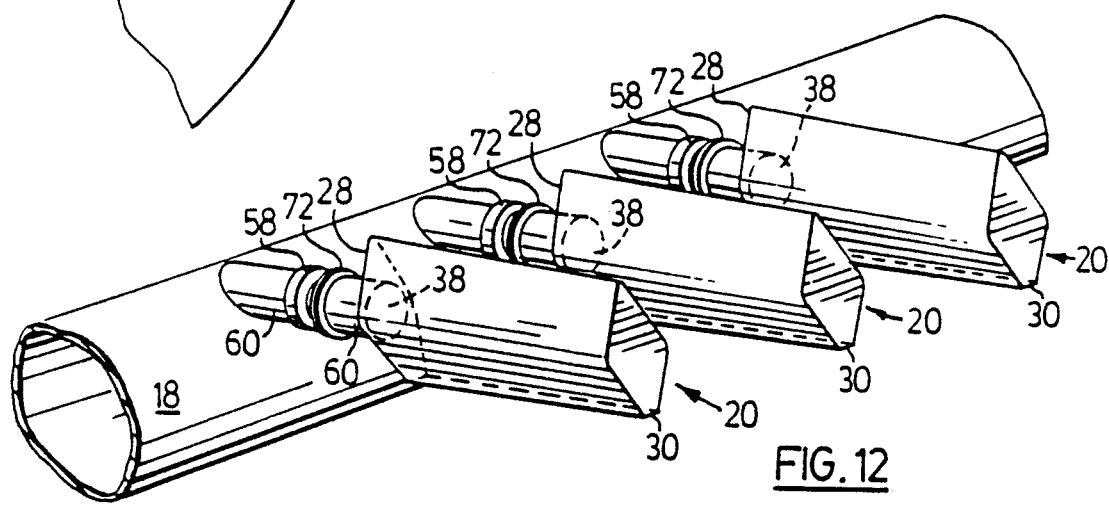
FIG. 12 is a perspective view of an array of nozzles according to the present invention.

The nozzles 20 further have a pressurized gas inlet for receiving pressurized gas from duct 18. Such an inlet is shown at reference 38 in FIG. 12 as an opening in the nozzles 20 adjacent the fuselage 10. The inlet 38 fluidly communicates with the duct 18 through a connecting duct 60 extending therebetween.

The nozzles 20 have an outlet 30 along their bottom edges as shown in FIG. 2. The outlets 30 fluidly communicate with the inlets so that pressurized gas from the engine 12 enters the inlet of the nozzles 20, passes through the nozzles 20 and is discharged from the outlets 30. The nozzle structure and the nature of fluid communication between the nozzle inlets and the outlets will be described more fully below.

The nozzles 20 are rotatable about an axis 32 which is generally perpendicular to that portion of the fuselage 10 to which the nozzles 20 attach. Rotation may be achieved by mens of a rotatable joint in the connector duct 60 shown at reference 58 in FIGS. 11 and 12 and shown in detail in FIG. 13.

Figure 13:
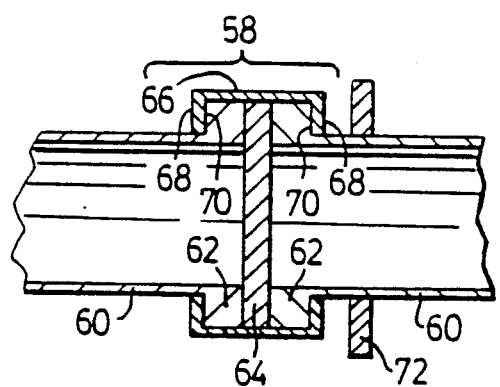
FIG. 13 is a cross-section through a rotatable coupling.

FIG. 13 illustrates a typical rotating coupling 58. FIG. 13 shows the connecting duct 60 being divided along its length and provided with a pair of mating flanges 62. A disc shaped spacer 64 is inserted between the opposed ends of the flanges 62. The spacer 64 can be, for example, of carbon to provide both sealing and self-lubricating qualities. The flanges 62 are held together by an outer ring 66 which encircles them. The outer ring 66 is internally contoured to correspond to the shape of the flanges and has inwardly projecting lips 68 which are adjacent the outer surfaces of the flanges, which are indicated by reference 70. The inwardly projecting lips prevent separation of the flanges in an axial direction. Other means of rotatably mounting the nozzles may be used.

The portion of the connector ducts 60 attaching to the nozzles 20 may be provided with teeth about their circumferance, for example at reference 72, which may receive input from a chain or worm type of drive to rotate the nozzles. Analogous systems such as levers and actuating cylinders may also be used to rotate the nozzles.

Figure 4:
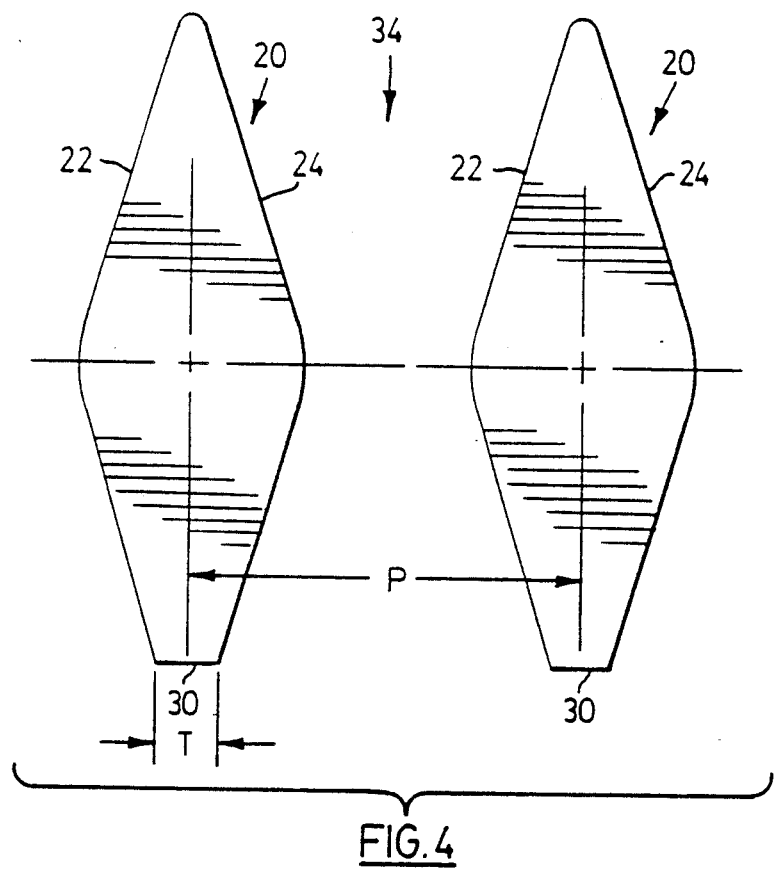
FIG. 4 shows an end view of two nozzles according to the present invention in the first position.
Figure 5:
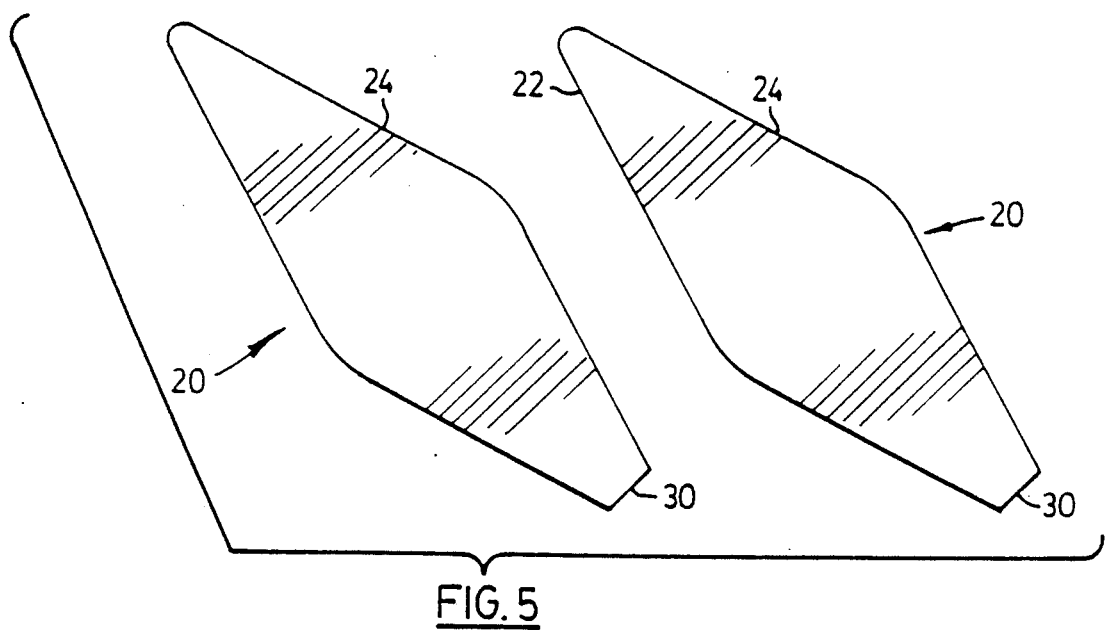
FIG. 5 shows two of the nozzles according to the present invention rotated to a position between the first and second positions.

FIGS. 2 and 4 show the nozzles in a first position where the outlets 30 are directed generally downwardly. In this position, thrust resulting from the discharge of pressurized gas from the nozzles 20 is in a generally vertical direction. This first position is used for VSTOL operation of the aircraft. Rotation of the nozzles, anti-clockwise as illustrated in the Figures, causes the outlets 30 to move rearwardly i.e. toward the rear of the aircraft FIG. 5 shows a pair of nozzles rotated approximately 45 degrees. FIG. 3 shows the nozzles in a second position at the limit of rotation wherein the first faces 22 and second faces 24 of adjacent nozzles contact. Rotation of the nozzles from the first toward the second position provides a horizontal thrust component which increases as the vertical thrust component is correspondingly reduced. In the configuration shown, the nozzles can be rotated so that the nozzle outlets 30 discharge from approximately 110° from the horizontal to 20° from the horizontal. The nozzles can therefore provide some rearward flight as well as foward flight.

In the first position as shown in FIGS. 2 and 4, the first faces 22 and second faces 24 of the nozzles 20 are spaced apart to define an air entrainment channel 34 between them. The discharge of pressurized gas from the nozzles causes air to flow through the air entrainment channels 34 and laterally into the jet efflux to mix with the pressurized gas being discharged from the nozzle outlets 30. This mixing of air with the pressurized gas discharging from the nozzles results in rapid decay of temperature and pressure of the pressurized gas away from the nozzles 30.

FIGS. 9 and 10 show a generally rectangular ejector lower door 54 in an open position, depending from the wing 11 adjacent the nozzles 20 and generally parallel to the fuselage 10. The ejector lower door 54 is rotatable about an axis 56 generally parallel to the face of the nozzles distal the fuselage. When the nozzles are in their second position, the ejector lower door can be rotated about the axis 56, in the direction shown by arrows 58 in FIG. 9, to a closed position wherein it covers the first faces 22 of the nozzles 20 and forms a surface generally continuous with the main wing 11.

When the ejector lower door 54 is in its open position, as shown in FIGS. 9 and 10, and the nozzles 20 are rotated to their first position, the ejector lower door 54 and the side of the fuselage 10 adjacent the fuselage side 28 of the nozzles 20, form generally parallel surfaces between which the nozzles 20 extend. The side of the fuselage 10 adjacent the fuselage side 28 of the nozzles 20, and the lower ejector door 54 in the open position prevent air from entering laterally into the air entrainment channels 34, below the upper surface of the main wing 11. This configuration, with appropriate nozzle spacing (which is discussed in more detail below), may act as an elementary ejector to augment the thrust from the nozzle outlets 30 according to the ejector principle.

In forward flight, the nozzles 20 are normally rotated to their second position as shown in FIG. 3 and the thrust from the engine 12 is directed through the outlet 16 in FIG. 1. Rotating nozzles 20 to the second position minimizes the amount of <rag created by the nozzles.

The nozzles may be constructed from metal plates generally formed in the rhomboid-like configuration of the nozzles illustrated in FIGS. 2 and 3. The outlet of such a nozzle may be provided by a rectangular opening in the nozzle bodies, an opening may be provided in the fuselage side 28 of the nozzles 20 to act as the inlet and the nozzle bodies may be hollow to provide fluid communication between the inlet and the nozzle outlets 30. Such a construction is useful for nozzles which operate at relatively low pressures. In some cases the relatively large, flat surfaces of this construction can result in deformation of the nozzle bodies if too high pressures are used in the nozzles. To resist this tendency to deform, the nozzles may be made of heavier gauge material, however this imparts a considerable weight penalty.

FIG. 10 shows an alternate nozzle shape. The nozzles 20 in FIG. 10 are of generally tear-drop shaped cross section, with the narrower end of the tear-drop corresponding to the nozzle outlets. A generally rectangular upper door 52 extends from adjacent the broader portion of each nozzle. The upper doors 52 are shown in an open position in FIG. 9 wherein they extend generally upwardly away from the upper surface of the wing 11. The upper doors 52 can attach to the nozzles 20 to rotate with nozzles 20, or be separately mounted adjacent the nozzles 20 to rotate about an axis 56 generally parallel to the axis 32. When the doors 52 are rotated in the direction shown by arrow 54, to a closed position, the doors 52 will cover the air entrainment channels 34 between the nozzles 20. In this second position, the doors 52 will be adjacent one another and form a surface generally continuous with the upper surface of the wing 11.

Figure 7:
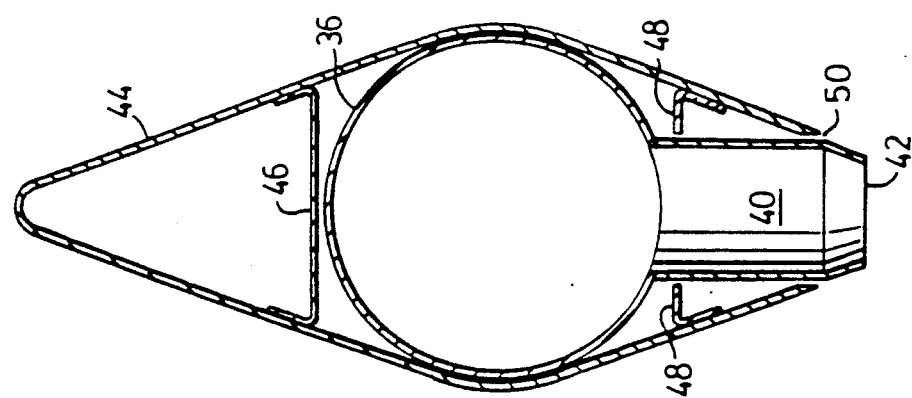
FIG. 7 shows a sectional view along the line 7—7 of FIG. 6.
Figure 6:
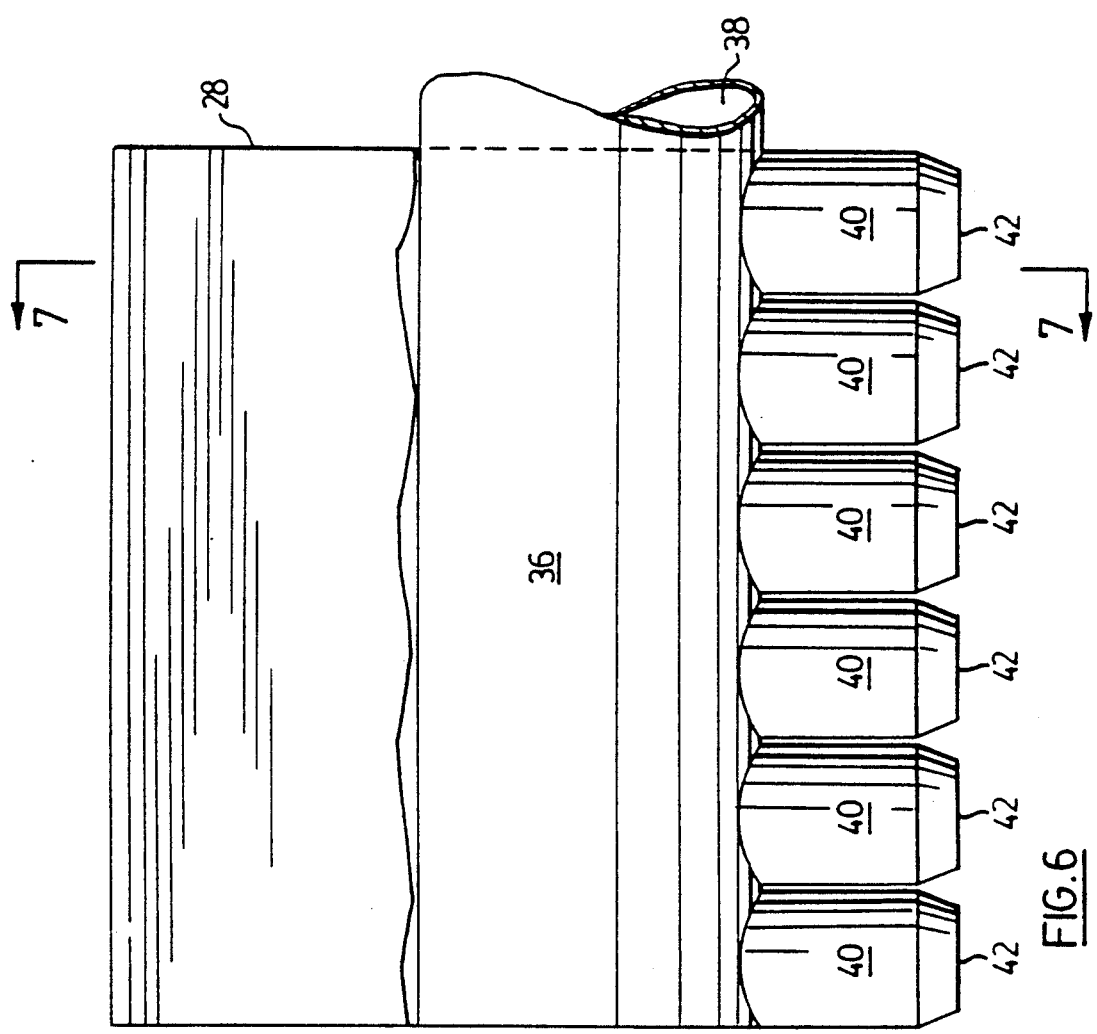
FIG. 6 shows a plan view of an embodiment of a nozzle according to the present invention with a portion of the shroud deleted for clarity.

FIGS. 6 and 7 illustrate an alternate nozzle construction suitable for high pressure operation without nozzle deformation. In this construction the nozzle has a generally cylindrical inlet pipe 36 with an opening 38 at one end defining the nozzle inlet. The end of the inlet pipe 36 distal from the inlet 38 is closed. A series of outlet pipes 40 project from the inlet pipe 36 along the length of the inlet pipe 36 and generally radial therewith. The inlet pipe 36 is provided with openings where the outlet pipes 40 attach. In this manner the interior of the inlet pipe 36 fluidly communicates with the outlet pipes 40. The outlet pipes 40 are provided with outlets 42 which act as the outlet of the nozzles. The cylindrical configuration of the inlet pipe 36 and outlet pipes 40 is better able to withstand internal pressure without deformation than a flat sided configuration.

The nozzles configuration shown in FIGS. 6 and 7 is provided with a shroud 44 covering the inlet pipe 36 and the outlet pipes 40. The shroud 44 gives the nozzle body its shape. The shape of shroud 44 is selected to optimize the airflow characteristics over and between the nozzles.

The shroud is shown as having a generally parallelogram shaped cross section with a shorter dimension across the inlet pipe 36 and a longer dimension parallel to the outlet pipes 40. These shapes minimize the height of the nozzles in the second position as shown for example in FIG. 3 for the generally rhomboid shaped configuration, to reduce the aerodynamic drag of the nozzles. Brackets 48 and 46, above and below the inlet pipe 36 respectively, act to reinforce the shroud and hold it in place over the inlet and outlet pipes. The shroud 44 is further provided with an opening 50 through which the outlets 42 of outlet pipes 40 project.

Alternatively, the shroud can be shaped to correspond to the nozzle configuration shown in FIG. 10, and generally rectangular doors, such as shown at reference 52 in FIG. 10, can be attached so as to project generally upwardly from adjacent the side of the inlet pipe 36 which corresponds to the second face of the nozzles.

In order to use the thrust deflector arrangement described above installed in a main wing or stub wing as an elementary ejector, it is desirable to dimension the nozzles 20 in such a manner as to maximize downward thrust while minimizing the aerodynamic drag caused by the nozzles. If the nozzles are too thick and the pressure exiting from them too high, flow between the nozzles will become supersonic thereby ruining the augmentation effect.

It has been found that an optimal amount of decay and thrust augmentation occurs when the total cross sectional area of the air entrainment channels 34, at their narrowest part, to the total area of the nozzle outlets is 10 or more.

Figure 11:
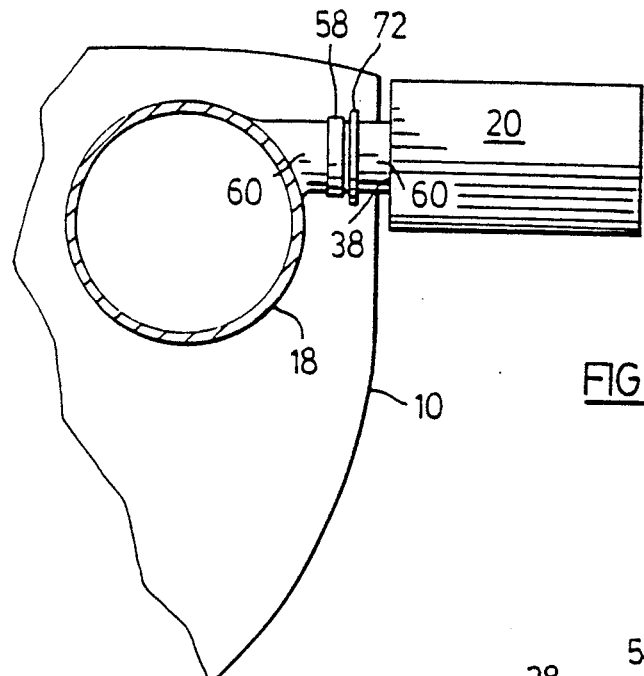
FIG. 11 is a partial cross-section through the fuselage of a VSTOL aircraft showing a nozzle according to the present invention connected to a duct.

It has been found that nozzles of the configuration illustrated in FIGS. 10 and 11 when used in the elementary ejector configuration function well with pitch to thickness ratios of approximately 10 to 20. The pitch is the distance between the vertical centre lines of the nozzles and is indicated by reference P in FIG. 4. The nozzle thickness is the width of the nozzle opening at right angles to the rotational axis and is indicated by reference T in FIG. 4. The length of the nozzle is indicated by reference L in FIG. 2.

If the nozzles 20 are used in stub wings as shown in FIGS. 2, 3 and 8, not as an ejector, it has been found that good nozzle performance can be achieved with nozzle pitch to thickness ratios on the order of 5 to 15.

It has also been found that optimal nozzle performance is achieved with nozzles having an aspect ratio of from 4 to 20 in the stub wing mounting shown in FIGS. 2, 3 and 8. The aspect ratio is the ratio of the length of a nozzle to its thickness. For the arrangement shown in FIGS. 9 and 10, it has been found that an aspect ratio of from 10 to 20 will give optimal thrust augmentation.

Various other modifications and changes will occur to those skilled in the art without departing from the scope of the invention as defined in the attached claims.

We claim:

1. A thrust deflector arrangement for use in VSTOL aircraft having a pressurized gas generator fluidly communicating with a horizontal thrust outlets through a passage, said thrust deflector arrangement comprising:
   a plurality of adjacent nozzles mounted in an aerodynamic element having upper and lower surfaces, each of said nozzles having;
   a unitary body with a first face and second face,
   an inlet for receiving pressurized gas from said passage,
   and at least one outlet fluidly connected with said inlet for discharging said pressurized gas;
   each of said nozzles being rotatable about an axis from a first position in which said outlet is directed generally downwardly, to a second position where said outlet is directed generally rearwardly;
   in said first position said first and second faces of said bodies of adjacent nozzles are spaced apart thereby defining an air entrainment channel therebetween, said air entrainment channel being generally unobstructed above and below said nozzles;
   in said second position said first and second faces of said adjacent nozzles contact thereby closing said air entrainment channel and forming continuous upper and lower surfaces which are least adjacent the upper and lower surfaces respectively of the aerodynamic element.

2. A thrust deflector as in claim 1 wherein said nozzles further comprise:
   an inlet pipe having an opening defining said inlet;
   at least one outlet pipe projecting from said inlet pipe and having an open end distal from said inlet pipe, said open end defining said outlet; and,
   a shroud covering said inlet and outlet pipes, said shroud having openings to permit entry of pressurized gas from said pressurized gas generator into said inlet and to permit discharge of said pressurized gas from said outlet, said shroud further defining said nozzle body.

3. A thrust deflector as in claim 1 wherein said nozzles have a generally tear-drop shaped cross section converging toward said outlets; said thrust deflector further has an upper door rotatably mounted adjacent said nozzles distal said outlets, said upper door being rotatable from an open position permitting air entry into said air entrainment channels, to a closed position across said air entrainment channels; said upper doors in said closed position forming a generally continuous surface.

4. A VSTOL aircraft incorporating the thrust deflector of claims 1, 2 or 3 wherein said nozzles are mounted in a stub wing along either side of the fuselage.

5. A VSTOL aircraft incorporating the thrust deflector of claims 1, 2 or 3 wherein said nozzles are mounted in a stub wing along either side of the fuselage of said aircraft and the aspect ratio of said nozzles ranges from 4 to 20.

6. A VSTOL aircraft incorporating the thrust deflector of claims 1, 2 or 3 where said nozzles are mounted in a stub wing on either side of the fuselage of said aircraft and the pitch to thickness ratio ranges from 5 to 15.

7. A VSTOL aircraft incorporating the thrust deflector of claims 1, 2 or 3 wherein said nozzles are mounted in a stub wing on either side of the fuselage of said aircraft, the aspect ratio of said nozzles ranges from 4 to 20 and the pitch to thickness ratio of said nozzles ranges from 5 to 15.

8. A VSTOL aircraft incorporating the thrust deflector of claims 1, 2 or 3 wherein said nozzles are mounted in a chordwise arrangement in the main wing of said aircraft.

9. A VSTOL aircraft incorporating the thrust deflector of claims 1 2 or 3 wherein said nozzles are mounted in a chordwise arrangement in the main wing of said aircraft, said nozzles having an aspect ratio from 10 to 20.

10. A VSTOL aircraft incorporating the thrust deflector of claims 1, 2 or 3 wherein said nozzles are mounted in a chordwise arrangement in the main wing of said aircraft, said nozzles having a pitch to thickness ratio from 10 to 20.

11. A VSTOL aircraft incorporating the thrust deflector of claims 1, 2 or 3 wherein said nozzles are mounted in a chordwise arrangement in the main wing of said aircraft, said nozzles having an aspect ratio from 10 to 20 and said nozzles having a pitch to thickness ratio from 10 to 20.

12. A VSTOL aircraft incorporating the thrust deflector of claims 1, 2 or 3 wherein said nozzles are mounted in a chordwise arrangement in the main wing of said aircraft;
said thrust deflector further having an ejector lower door mounted adjacent said faces of said nozzles distal the fuselage of said aircraft, said ejector door being moveable from an open position, generally parallel to the side of the fuselage adjacent said nozzles, to a closed position wherein said ejector lower door substantially covers said first faces of said nozzles when said nozzles are in their second position.

13. A VSTOL aircraft incorporating the thrust deflector of claims 1, 2 or 3 wherein said nozzles are mounted in a chordwise arrangement in the main wing of said aircraft; said thrust deflector further having an ejector lower door mounted adjacent said faces of said nozzles distal the fuselage of said aircraft, said ejector door being moveable from an open position, generally parallel to the side of the fuselage adjacent said nozzles, to a closed position wherein said ejector lower door substantially covers said first faces of said nozzles when said nozzles are in their second position; and,
said nozzles have an aspect ratio from 10 to 20.

14. A VSTOL aircraft incorporating the thrust deflector of claims 1, 2 or 3 wherein said nozzles are mounted in a chordwise arrangement in the main wing of said aircraft;
said thrust deflector further having an ejector lower door mounted adjacent said faces of said nozzles distal the fuselage of said aircraft, said ejector door being moveable from an open position, generally parallel to the side of the fuselage adjacent said nozzles, to a closed position wherein said ejector lower door substantially covers said first faces of said nozzles when said nozzles are in their second position; and, said nozzles have a pitch to thickness ratio from 10 to 20.

15. A VSTOL aircraft incorporating the thrust deflector of claims 1, 2 or 3 wherein said nozzles are mounted in a chordwise arrangement in the main wing of said aircraft;
said thrust deflector further having an ejector lower door mounted adjacent said faces of said nozzles distal the fuselage of said aircraft, said ejector door being moveable from an open position, generally parallel to the side of the fuselage adjacent said nozzles, to a closed position wherein said ejector lower door substantially covers said first faces of said nozzles when said nozzles are in their second position;
said nozzles have an aspect ratio from 10 to 20 and a pitch to thickness ratio from 10 to 20.

16. A thrust deflector as in claim 2 wherein said nozzles have a generally tear-drop shaped cross section converging toward said outlets; said thrust deflector further has an upper door rotatably mounted adjacent said nozzles distal said outlets, said upper door being rotatable from an open position permitting air entry into said air entrainment channels, to a closed position across said air entrainment channels; said upper doors in said closed position forming a generally continuous surface; and, said thrust deflector further having an ejector lower door mounted adjacent said faces of said nozzles distal the fuselage of said aircraft, said ejector door being moveable from an open position, generally parallel to the side of the fuselage adjacent said nozzles, to a closed position wherein said ejector lower door substantially covers said first faces of said nozzles are in their second position.

17. A VSTOL aircraft incorporating the thrust deflector of clam 16 wherein said nozzles are mounted in a chordwise arrangement in the main wing of said aircraft.

18. A VSTOL aircraft incorporating the thrust deflector of claim 16 wherein said nozzles are mounted in a chordwise arrangement in the main wing of said aircraft, said nozzles having an aspect ratio from 10 to 20.

19. A VSTOL aircraft incorporating the thrust deflector of claim 16 wherein said nozzles are mounted in a chordwise arrangement in the main wing of said aircraft, said nozzles having a pitch to thickness ratio from 10 to 20.

20. A VSTOL aircraft incorporating the thrust deflector of claim 16 wherein said nozzles are mounted in a chordwise arrangement in the main wing of said aircraft, said nozzles having an aspect ratio 10 to 20 and a pitch to thickness ratio from 10 to 20.

* * * * *